3,291,787
**CARBAZOLEDISULFONIC ACID 3,6-TETRAZO-
NIUM DICHLORIDE**
Henry M. Grotta, Delaware, Ohio, and Myron N. Lugasch, deceased, late of Columbus, Ohio, by Phyllis T. Lugasch, heir, Scranton, Pa., assignors, by mesne assignments, to Martin-Marietta Corporation, New York, N.Y., a corporation of Maryland
No Drawing. Filed Sept. 11, 1963, Ser. No. 308,309
1 Claim. (Cl. 260—141)

The present invention relates to a solution of carbazoledisulfonic acid 1,6-tetrazonium dichloride and to the method for making the same.

The solution of the present invention is useful as an intermediate which may be reacted with sodium azide to form 1,6-diazidocarbazoledisulfonic acid, which is useful as a component in coating deep-etch positive photolithographic plates. For example, an aqueous dispersion comprising 1,6-diazidocarbazoledisulfonic acid, 3,6-diazidocarbazoledisulfonic acid, hydroxyethylcellulose, and ammonium hydroxide may be applied as the light sensitive coating to photolithographic plates in the conventional manner. The solution of the present invention may also be coupled with naphthols to form valuable direct dyes and pigments.

Generally speaking, the method of the present invention comprises the steps of sulfonating 1,6-dinitrocarbazole to form 1,6-dinitrocarbazoledisulfonic acid, reducing the 1,6-dinitrocarbazoledisulfonic acid to form 1,6-diaminocarbazoledisulfonic acid, and tetrazotizing the 1,6-diaminocarbazoledisulfonic acid to form a solution of carbazoledisulfonic acid 1,6-tetrazonium dichloride.

The following is an illustrative example of the method of the present invention.

1,6-dinitrocarbazole is prepared as follows. A slurry is prepared by adding 44.7 gm. of carbazole to 350 gms. of glacial acetic acid. The slurry is stirred and maintained at 30°–40° C. for 1.5 hours, during which time 19.2 gms. of sodium nitrite is added. The slurry is heated and stirred for 30 additional minutes, following which an additional 2.7 gms. of sodium nitrite is added, resulting in 9-nitrosocarbazole, mostly in solution. A solution containing 40.5 gms. of 90% nitric acid and 40.5 gms. of glacial acetic acid is added thereto, during a period of 1.3 hours, with stirring and cooling to 30°–40° C. The resultant slurry is stirred at 30°–40° C. for 3.5 additional hours, then held at 55° C. for 1.5 hours, then held at 65° C. for 1.5 hours, then held at 95° C. for two hours, cooled to 65° C., filtered, the filtrate discarded; and the resulting solid washed with 191.5 ml. of cold glacial acetic acid, washed with water, and dried. 47 gms. of a crude mixture of 1,6-dinitrocarbazole and 3,6-dinitrocarbazole results. To 45.8 gms. of the crude dinitrocarbazoles is added, with stirring, 3.02 liters of a 60 gm. per liter solution of potassium hydroxide in absolute ethyl alcohol. A solution of the potassium salt of 3,6-dinitrocarbazole and an insoluble residue of the potassium salt of 1,6-dinitrocarbazole results. These potassium salts are separated by filtration and the insoluble residue (potassium salt of 1,6-dinitrocarbazole) is digested on a steam bath with 201 ml. of a 5% aqueous solution of hydrochloric acid. The resulting solid is recovered by filtration, washed with warm water to remove KCl, dried, dissolved in hot nitrobenzene, and filtered while hot and in solution. The filtrate is cooled to recrystallize the 1,6-dinitrocarbazole which is recovered by filtration and dried under vacuum. 14.5 gms. of 1,6-dinitrocarbazole having a melting point of 344°–346° C. is recovered.

The 1,6-dinitrocarbazole is sulfonated and reduced to 1,6-diaminocarbazoledisulfonic acid as follows. 14.5 gms. of 1,6-dinitrocarbazole and 57 gms. 98% $H_2SO_4$ are stirred at 50° C. for one hour, gradually heated to 90° C. over two hours, held at 90° C. for two additional hours, cooled to 30° C., added to 250 ml. water, neutralized with NaOH, cooled to 25° C., filtered, and the precipitate collected. The precipitate is added to a beaker containing 150 ml. water, 16 gms. powdered iron, and 3 ml. 30% HCl, followed by stirring and boiling for 12 hours. The composition in the beaker is neutralized with $Na_2CO_3$, filtered to remove the iron sludge, and the resulting filtrate boiled with carbon and filtered while hot to remove the carbon. The filtrate is evaporated to 100 ml. or less, cooled to 15° C., and the solids recovered by filtration and dried at 60° C. About 6 gms. of 1,6-diaminocarbazoledisulfonic acid results.

The remainder of the synthesis is conducted in subdued light.

The 1,6-diaminocarbazoledisulfonic acid is tetrazotized by adding 25.6 ml. concentrated HCl to 6 gms. of 1,6-diaminocarbazoledisulfonic acid in 67.4 ml. water, cooling it to 5° C., and adding 2.3 gms. sodium nitrite in saturated aqueous solution thereto, while the temperature is maintained at 5°–10° C. The resulting composition is filtered, and the filtrate is a solution of carbazoledisulfonic acid 1,6-tetrazonium dichloride.

What is claimed is:
Carbazoledisulfonic acid 1,6-tetrazonium dichloride.

References Cited by the Examiner
UNITED STATES PATENTS

| | | | |
|---|---|---|---|
| 1,931,826 | 10/1933 | Muth et al. | 260—315 |
| 1,973,012 | 9/1934 | Muth et al. | 260—315 |

CHARLES B. PARKER, *Primary Examiner.*

F. D. HIGEL, *Assistant Examiner.*